US011302315B2

United States Patent
Pereira et al.

(10) Patent No.: US 11,302,315 B2
(45) Date of Patent: *Apr. 12, 2022

(54) DIGITAL VIDEO FINGERPRINTING USING MOTION SEGMENTATION

(71) Applicant: Roku, Inc., San Jose, CA (US)

(72) Inventors: Jose Pio Pereira, Cupertino, CA (US); Mihailo M. Stojancic, San Jose, CA (US)

(73) Assignee: Roku, Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/916,179

(22) Filed: Jun. 30, 2020

(65) Prior Publication Data
US 2021/0020171 A1 Jan. 21, 2021

Related U.S. Application Data

(63) Continuation of application No. 16/140,534, filed on Sep. 25, 2018, now Pat. No. 10,733,985, which is a
(Continued)

(51) Int. Cl.
*G06K 9/00* (2006.01)
*G10L 15/20* (2006.01)
(Continued)

(52) U.S. Cl.
CPC .............. *G10L 15/20* (2013.01); *G06F 16/00* (2019.01); *G06F 16/45* (2019.01); *G06F 16/48* (2019.01);
(Continued)

(58) Field of Classification Search
CPC .. G06K 9/0063; G06K 9/6268; G06K 9/6407; G06K 9/2009; G06K 9/6423;
(Continued)

(56) References Cited

U.S. PATENT DOCUMENTS 6,421,090 B1 * 7/2002 Jiang ..................... H04N 7/012
348/448
7,110,454 B1 9/2006 Chakraborty
(Continued)

OTHER PUBLICATIONS

Bougleux, S., et al., "Image Smoothing and Segmentation by Graph Regularization", ISVC'05 Proceedings of the First International Conference on Advances in Visual Computing, Dec. 5-7, 2005, pp. 745-752.
(Continued)

*Primary Examiner* — Amir Alavi
(74) *Attorney, Agent, or Firm* — McDonnell Boehnen Hulbert & Berghoff LLP

(57) ABSTRACT

Methods of processing video are presented to generate signatures for motion segmented regions over two or more frames. Two frames are differenced using an adaptive threshold to generate a two-frame difference image. The adaptive threshold is based on a motion histogram analysis which may vary according to motion history data. Also, a count of pixels is determined in image regions of the motion adapted two-frame difference image which identifies when the count is not within a threshold range to modify the motion adaptive threshold. A motion history image is created from the two-frame difference image. The motion history image is segmented to generate one or more motion segmented regions and a descriptor and a signature are generated for a selected motion segmented region.

20 Claims, 12 Drawing Sheets

Related U.S. Application Data continuation of application No. 15/456,856, filed on Mar. 13, 2017, now Pat. No. 10,318,813.

(60) Provisional application No. 62/306,719, filed on Mar. 11, 2016, provisional application No. 62/306,707, filed on Mar. 11, 2016, provisional application No. 62/306,700, filed on Mar. 11, 2016.

(51) Int. Cl.

| | | |
|---|---|---|
| *G06K 9/46* | (2006.01) | |
| *G06T 7/246* | (2017.01) | |
| *G06T 7/215* | (2017.01) | |
| *G06K 9/62* | (2022.01) | |
| *G06F 16/00* | (2019.01) | |
| *G06T 7/254* | (2017.01) | |
| *G06F 16/45* | (2019.01) | |
| *G06F 16/48* | (2019.01) | |
| *G10L 15/02* | (2006.01) | |
| *G10L 15/06* | (2013.01) | |
| *G10L 15/10* | (2006.01) | |
| *G10L 15/14* | (2006.01) | |
| *G10L 21/0232* | (2013.01) | |
| *G10L 25/81* | (2013.01) | |
| *G06F 16/906* | (2019.01) | |
| *G06F 16/44* | (2019.01) | |
| *G10L 21/0216* | (2013.01) | |

(52) U.S. Cl.
CPC ....... *G06K 9/00718* (2013.01); *G06K 9/4642* (2013.01); *G06K 9/6215* (2013.01); *G06T 7/215* (2017.01); *G06T 7/248* (2017.01); *G06T 7/254* (2017.01); *G10L 15/02* (2013.01); *G10L 15/063* (2013.01); *G10L 15/10* (2013.01); *G10L 15/142* (2013.01); *G10L 21/0232* (2013.01); *G10L 25/81* (2013.01); *G06F 16/44* (2019.01); *G06F 16/906* (2019.01); *G06T 2207/10016* (2013.01); *G06T 2207/20004* (2013.01); *G06T 2207/20224* (2013.01); *G10L 2015/025* (2013.01); *G10L 2021/02166* (2013.01)

(58) Field of Classification Search
CPC .... G06K 9/4642; G06K 9/6215; G06T 7/215; G06T 7/248; G06T 7/254; G06T 2207/10016; G06T 2207/20004; G06T 2207/20224; G10L 15/02; G10L 15/063; G10L 15/10; G10L 15/142; G10L 21/0232; G10L 25/81; G10L 2015/025
See application file for complete search history.

(56) References Cited

U.S. PATENT DOCUMENTS

| | | | |
|---|---|---|---|
| 7,257,237 B1* | 8/2007 | Luck | A61B 5/1113 |
| | | | 382/103 |
| 7,542,095 B2 | 6/2009 | Zhou | |
| 8,189,945 B2 | 5/2012 | Stojancic et al. | |
| 8,195,689 B2 | 6/2012 | Ramanathan et al. | |
| 8,229,227 B2 | 7/2012 | Stojancic et al. | |
| 8,249,334 B2* | 8/2012 | Berliner | G06T 7/12 |
| | | | 382/154 |
| 8,335,786 B2 | 12/2012 | Pereira et al. | |
| 8,385,644 B2 | 2/2013 | Stojancic et al. | |
| 8,655,878 B1 | 2/2014 | Kulkarni et al. | |
| 8,666,152 B1 | 3/2014 | Ramanathan et al. | |
| 8,830,236 B2* | 9/2014 | Germann | G06K 9/00201 |
| | | | 345/420 |
| 8,891,818 B2* | 11/2014 | Sharma | G06T 7/246 |
| | | | 382/103 |
| 8,959,108 B2 | 2/2015 | Pereira et al. | |
| 9,230,333 B2* | 1/2016 | Robinson | H04N 19/119 |
| 9,430,701 B2* | 8/2016 | Roy | G06K 9/4638 |
| 10,007,863 B1 | 6/2018 | Pereira et al. | |
| 10,318,813 B1* | 6/2019 | Pereira | G10L 15/10 |
| 10,733,985 B2* | 8/2020 | Pereira | G06K 9/00718 |
| 2006/0061683 A1* | 3/2006 | Chen | H04N 7/012 |
| | | | 348/452 |
| 2007/0025614 A1 | 2/2007 | Qian | |
| 2008/0292142 A1* | 11/2008 | Woo | G06T 7/215 |
| | | | 382/107 |
| 2010/0021009 A1 | 1/2010 | Yao | |
| 2013/0016911 A1 | 1/2013 | Rolland-Neviere et al. | |
| 2013/0187937 A1 | 7/2013 | Kerofsky et al. | |
| 2013/0188836 A1 | 7/2013 | Fang et al. | |
| 2014/0002730 A1 | 1/2014 | Thomson et al. | |
| 2016/0078272 A1 | 3/2016 | Hammoud | |
| 2016/0125620 A1 | 5/2016 | Heinrich et al. | |
| 2017/0153711 A1 | 6/2017 | Dai et al. | |
| 2019/0045192 A1* | 2/2019 | Socek | H04N 19/80 |

OTHER PUBLICATIONS

Paris, S., "Edge-preserving Smoothing and mean-Shift Segmentation of Video Streams", ECCV '08 Proceedings of the 10th European Conference on Computer Vision, Part II, Oct. 12-18, 2008, pp. 460-473.

Sun, X., et al., "A Motion Activity Descriptor and It's Extraction in Compressed Domain", PLM '01 Proceedings of the Second IEEE Pacific Rim Conference on Multimedia: Advances in Multimedia Information Processing, Oct. 24-26, 2001, pp. 450-457.

Treetasantavorn, S., et al., "Bayesian method for Motion Segmentation and Tracking in Compressed Videos", "Lecture Notes in Computer Science", 2005, pp. 277-284, vol. 3663.

Zhang, D., et al., "Segmentation of Moving Objects in Image Sequence: A Review", "Circuits Systems and Signal Processing", Mar. 2001, pp. 143-183, vol. 20, No. 2.

Note: For the non-patent literature citations that no month of publication is indicated, the year of publication is more than 1 year prior to the effective filing date of the present application.

* cited by examiner

DIGITAL VIDEO FINGERPRINTING USING MOTION SEGMENTATION

The present application is a continuation of U.S. patent application Ser. No. 16/140,534 filed Sep. 25, 2018, which is a continuation of U.S. patent application Ser. No. 15/456,856 filed Mar. 13, 2017, which claims the benefit of U.S. Provisional Patent Application No. 62/306,719 filed on Mar. 11, 2016, U.S. Provisional Patent Application No. 62/306,707 filed on Mar. 11, 2016, and U.S. Provisional Patent Application No. 62/306,700 filed on Mar. 11, 2016, the contents of which are hereby incorporated by reference herein in their respective entireties.

CROSS REFERENCE TO RELATED APPLICATIONS

U.S. Pat. No. 8,229,227 filed Jun. 18, 2008 entitled "Methods and Apparatus for Providing a Scalable Identification of Digital Video Sequences"; U.S. Pat. No. 8,385,644 filed Jun. 25, 2009 entitled "Digital Video Fingerprinting Based on Resultant Weighted Gradient Orientation Computation"; U.S. Pat. No. 8,189,945 filed Nov. 5, 2009 entitled "Digital Video Content Fingerprinting Based on Scale Invariant Interest Region Detection with an Array of Anisotropic Filters"; U.S. Pat. No. 8,195,689 filed May 3, 2010 entitled "Media Fingerprinting and Identification System"; U.S. Pat. No. 8,335,786 filed May 27, 2010 entitled "Multi-Media Content Identification Using Multi-Level Content Signature Correlation and Fast Similarity Search"; U.S. Pat. No. 8,666,152 filed Nov. 29, 2010 entitled "Digital Video Content Fingerprinting Using Image Pixel Intensity and Color Information"; U.S. Pat. No. 8,655,878 filed May 6, 2011 entitled "A Scalable, Adaptable, and Manageable System for Multimedia Identification"; U.S. Pat. No. 8,959,108 filed Oct. 18, 2011 entitled "Distributed and Tiered Architecture for Content Search and Content Monitoring"; and U.S. patent application Ser. No. 15/172,826 filed Jun. 3, 2016 entitled "Logo Recognition in Images and Videos", have the same assignee as the present application, are related applications, and are hereby incorporated by reference in their entirety.

FIELD OF THE INVENTION

The present invention relates generally to improvements in video and image processing architectures and methods for feature extraction from a digital video sequence. More particularly, the present invention addresses methods for video sequence spatio-temporal motion field detection and efficient signature generation for selected intra-frame spatial pixel formations in temporal motion to improve content feature extraction, identification of videos and objects, including logos, and search in fingerprint systems.

BACKGROUND OF THE INVENTION

In contemporary video broadcast environment many systems use presentation time stamps to maintain audio-video synchronization. These time stamps are in general arbitrary values associated with the audio and video signals, and have no actual relation to the content of either of them. In addition, identification of videos, objects, including logos, and audio-video synchronization are dynamic in nature and can substantially change over broadcasting time resulting in numerous errors. For example, if, in the broadcast processing flow, the timing information is lost, or a slight misalignment is introduced in either audio or in video, audio-video synchronization may be lost beyond an immediate possibility for recovery.

In addition, improvements to content feature extraction, identification of videos and objects, including logos, and search in fingerprint systems remain difficult to achieve. For example, locating objects and logos while they are in motion remains a difficult problem resulting in numerous errors, including false positive identifications, in many systems due to similar frames, for example.

A comprehensive solution to the above problems must dynamically adjust to incoming content while a broadcasting system is in full operation, and the solution must work for all types of altered and distorted audio and video content within the limitations of a typical broadcast environment.

SUMMARY OF THE INVENTION

In one or more of its several aspects, the present invention recognizes that a better focus on objects, including logos, while in motion is required to allow finer details to be recognized and improve accurate identifications. One embodiment of the invention presents a method of processing video to generate signatures for motion segmented regions over two or more frames. Two frames are differenced using an adaptive threshold to generate a two-frame difference image. A motion history image is created from the two-frame difference image. The motion history image is segmented to generate one or more motion segmented regions. A descriptor and a signature are generated for a selected motion segmented region.

Another embodiment of the invention addresses a method of fingerprinting moving images taking into account motion across multiple frames. Two frames are differenced using a motion adaptive threshold based on a motion histogram analysis to generate a motion adapted two-frame difference image. As frames are received, a motion history image is determined from generated motion adapted two-frame difference images over a plurality of frames. The motion history image is segmented to generate one or more motion segmented regions. A descriptor and a signature are generated for a selected motion segmented region.

A further embodiment of the invention addresses a computer readable non-transitory medium storing a computer program which causes a computer system to perform a method of processing video to generate signatures for motion segmented regions over two or more frames. Two frames are differenced using an adaptive threshold to generate a two-frame difference image. A motion history image is created from the two-frame difference image. The motion history image is segmented to generate one or more motion segmented regions. A descriptor and a signature are generated for a selected motion segmented region.

BRIEF DESCRIPTION OF THE DRAWINGS

These and other features, aspects, techniques and advantages of the present invention will be apparent to those skilled in the art from the following detailed description, taken together with the accompanying drawings and claims. Understanding that these drawings depict only exemplary embodiments and are, therefore, not to be considered limiting of the present invention's scope, the exemplary embodiments of the present invention is described with additional specificity and detail through use of the accompanying drawings in which:

DETAILED DESCRIPTION

Figure 1:
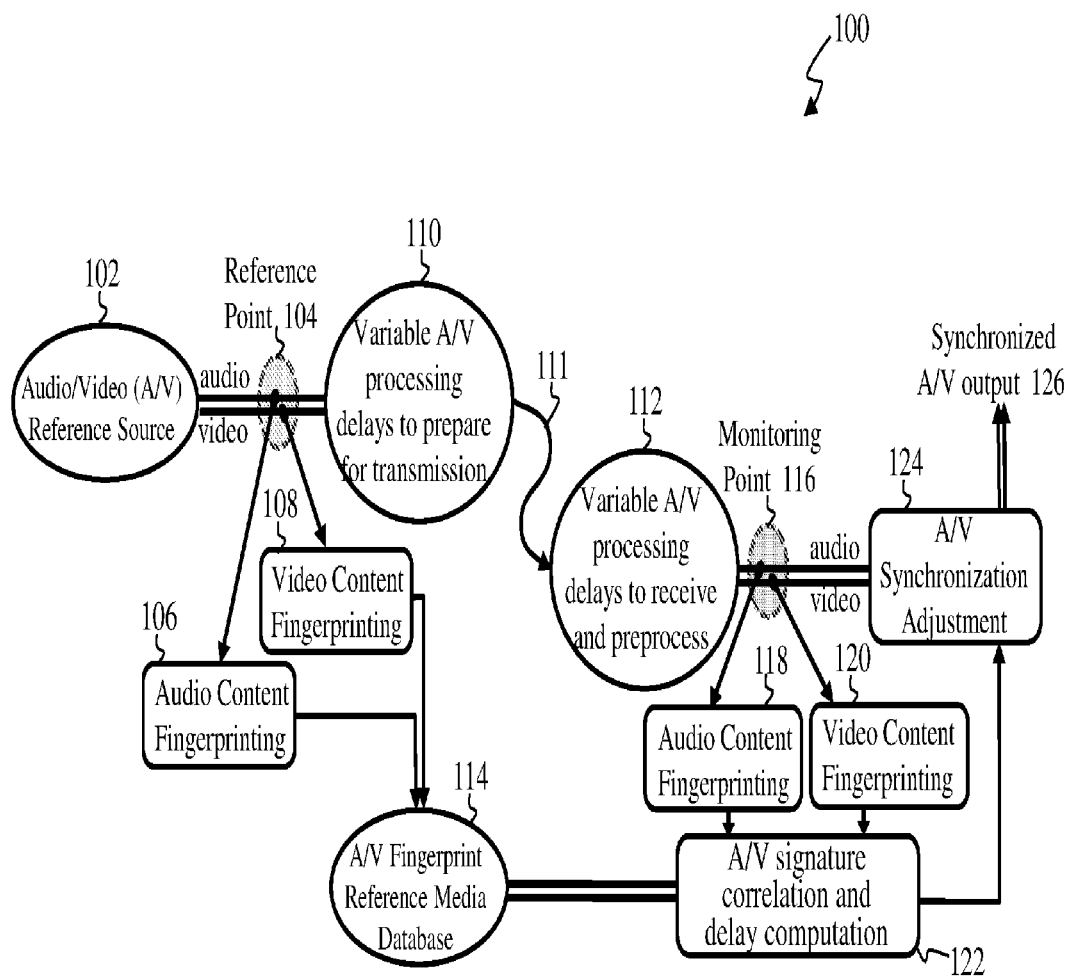
FIG. 1 illustrates an audio/video (A/V) system in accordance with an embodiment of the present invention.

The present invention will now be described more fully with reference to the accompanying drawings, in which several embodiments of the invention are shown. This invention may, however, be embodied in various forms and should not be construed as being limited to the embodiments set forth herein. Rather, these embodiments are provided so that this disclosure will be thorough and complete, and will fully convey the scope of the invention to those skilled in the art.

It will be appreciated that the present disclosure may be embodied as methods, systems, or computer program products. Accordingly, the inventive concepts disclosed herein may take the form of a hardware embodiment, a software embodiment or an embodiment combining software and hardware aspects. Furthermore, the inventive concepts disclosed herein may take the form of a computer program product on a computer-readable storage medium having computer-usable program code embodied in the medium. Any suitable computer readable medium may be utilized including hard disks, CD-ROMs, optical storage devices, flash memories, or magnetic storage devices.

Computer program code or software programs and associated data that are operated upon or for carrying out operations according to the teachings of the invention may be written in a high level programming language such as C, C++, JAVA®, Smalltalk, JavaScript®, Visual Basic®, TSQL, Perl, use of .NET™ Framework, Visual Studio® or in various other programming languages. Software programs may also be written directly in a native assembler language for a target processor. A native assembler program uses instruction mnemonic representations of machine level binary instructions. Program code or computer readable medium as used herein refers to code whose format is understandable by a processor. Software embodiments of the disclosure do not depend upon their implementation with a particular programming language.

The methods described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. A computer-readable storage medium may be coupled to the processor through local connections such that the processor can read information from, and write information to, the storage medium or through network connections such that the processor can download information from or upload information to the storage medium. In the alternative, the storage medium may be integral to the processor.

To improve accuracy and efficiency of video fingerprinting for audio/video (A/V) applications, a process for video frame segmentation based on spatio-temporal motion detection is deployed. Motion detection and segmentation infers knowledge of boundaries presented as discontinuities in the pixel formation flow generated by a motion estimation process.

As addressed herein, an approach for motion segmentation of video frames from two successive frames is presented. Based on identified motion segmented regions, a descriptor is derived for each selected region which is subsequently used for signature generation. The signatures derived in this way are sensitive to motion field changes and hence lend themselves well to audio-video synchronization problems where the motion between successive video frames is often very slight in the talk show type of video sequences.

FIG. 1 illustrates an audio/video (A/V) system 100 in accordance with an embodiment of the present invention. As used herein, a video fingerprint is a calculated numerical value, alternatively termed a signature, which represents a prominent feature of a video frame. A collection of signatures drawn from a single video frame with multiple features generates a compact video frame representation, while a collection of signatures associated with each video frame in a video sequence with multiple frames forms the video sequence representation. A collection of signatures drawn from a single audio frame with multiple features generates a compact audio frame representation, while a collection of signatures associated with each audio frame in an audio sequence with multiple frames forms the audio sequence representation.

The system 100 comprises a reference source 102 for audio signals and video signals. The audio and video signals are sampled at a reference point 104 with the audio signal delivered to an audio content fingerprinting unit 106 and the video signal delivered to a video content fingerprinting unit 108. The audio and video signals are processed at source unit 110 causing variable delays to prepare for transmission. Transmission of the processed signals 111, either wirelessly or over wires, are received at destination unit 112 in a form which are delayed and likely distorted causing further delays in order to receive and prepare the signals at the destination point. The variable delays caused by the source unit 110, the transmission 111, and the destination unit 112 can cause a loss in synchronization between the audio and video signals.

The audio content fingerprints and the video content fingerprints are delivered from the fingerprinting units 106 and 108 to an audio/video reference media database 114 from which they may be accessed or delivered to the destination point. The received audio and video signals are sampled at a monitoring point 116 with the received audio signal delivered to an audio content fingerprinting unit 118 and the received video signal delivered to a video content fingerprinting unit 120. The received audio content fingerprints and the received video content fingerprints are delivered to an A/V signature correlation and delay computation unit 122.

In the system 100 exemplary processing presented herein, features, represented by fingerprints, from the reference content of both audio and video signals are extracted at the reference point 104 and then used at a monitoring point 116, where the same features, represented by fingerprints of the received audio and video signals, are extracted from a processed and distorted signal, to determine their temporal alignment. The fingerprints, also known as signatures, are aligned, in an A/V synchronization adjustment unit 124, with reference signatures with respect to known title and starting temporal point. The process of audio/video misalignment detection and re-synchronization at the monitoring point consists of monitored audio and video fingerprinting, reference audio/video fingerprint transfer (TCP/IP or MPEG), and reference and monitored content correlation to detect misalignment of both monitored audio and monitored video with respective references. The detected audio and video delays are then processed to derive overall misalignment that can be subsequently corrected by re-stamping presentation times for either the received audio or received video or both. The synchronized A/V output 126 is generated from the A/V synchronization adjustment unit 124.

Figure 2:
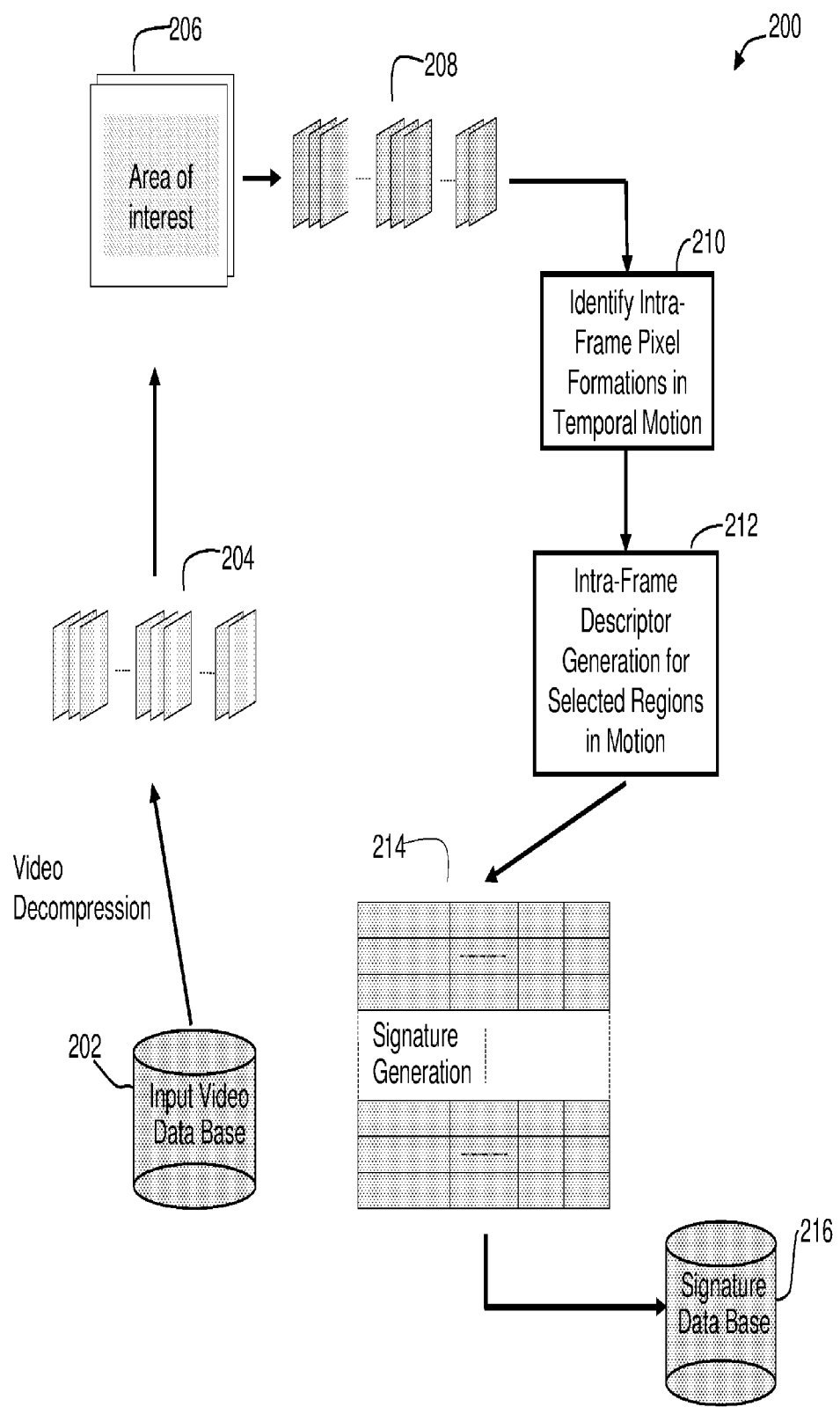
FIG. 2 illustrates a process for video analysis, motion video feature extraction, signature generation, and signature database formation in accordance with an embodiment of the present invention.

FIG. 2 illustrates a process 200 for video content feature extraction, signature generation, and database formation in accordance with an embodiment of the present invention. For use herein, a video sequence is defined as a plurality of video frames presented sequentially in time. As shown in FIG. 2, the basic functionality of a video sequence signature database formation consists of selecting a video sequence in step 204 from a video database in access step 202, and processing the video sequence in a series of process steps 206, 208, 210, 212, 214, and 216 in connection with processes shown in FIGS. 3-10. An analysis process step 206 includes processing a video sequence by video frame filtering for noise reduction and desired active region determination for each frame of the video sequence.

In steps 208 and 210, spatio-temporal video sequence analysis is performed to identify intra-frame pixel formations in temporal motion. In step 212, spatial video frame analysis is performed to determine intra-frame descriptor generation for selected regions in motion, in connection with the processes of FIGS. 3-8.

At signature generation process step 214, a set of signatures is constructed for selected regions in motion as described in more detail below in connection with the processes of FIGS. 3-8. For example, as described in further detail herein, compact multi-dimensional signatures are derived for K rectangular regions of size $(Ns_x) \times (Ms_y)$, where N and M are multipliers of the $(s_x, s_y)$ scales computed in spatial x and y directions, as described in more detail below.

An update process step 216 is utilized to insert a set of signatures into a signature database to be used for audio/video content feature extraction, identification, and search.

The overall process of video frame pre-processing and spatio-temporal video frame analysis for motion segmentation and descriptor/signature generation is described in the processes of FIGS. 3-8.

The description herein for spatio-temporal video sequence analysis for motion segmentation and descriptor/signature generation is presented by way of an example. However, the method is general with respect to an initial area selection, such as box size, block re-sampling grid size, and the number of dimensions drawn for the descriptor/signature generation.

Spatio-Temporal Motion Segmentation

Motion segmentation is an important pre-processing step for several applications in computer vision, such as surveillance, tracking, action recognition, etc. These applications motivated the development of several 2-D motion segmentation techniques. Such techniques aimed to separate each frame of a video sequence into different regions of coherent 2-D motion. For example, a video of a rigid scene seen by a moving camera could be segmented into multiple 2-D motions, because of depth discontinuities, occlusions, perspective effects, and the like. Over the past few years, several methods for segmenting a scene containing multiple moving objects have been proposed. However, most are too complex and too slow for real-time applications. Besides, too many parameters make these algorithms impractical for real-time applications. A real-time motion-based video segmentation algorithm that is adaptable over multiple frames is described below and is suitable for A/V system implementation presented here.

Real-Time Motion-Based Video Segmentation

Figure 3:
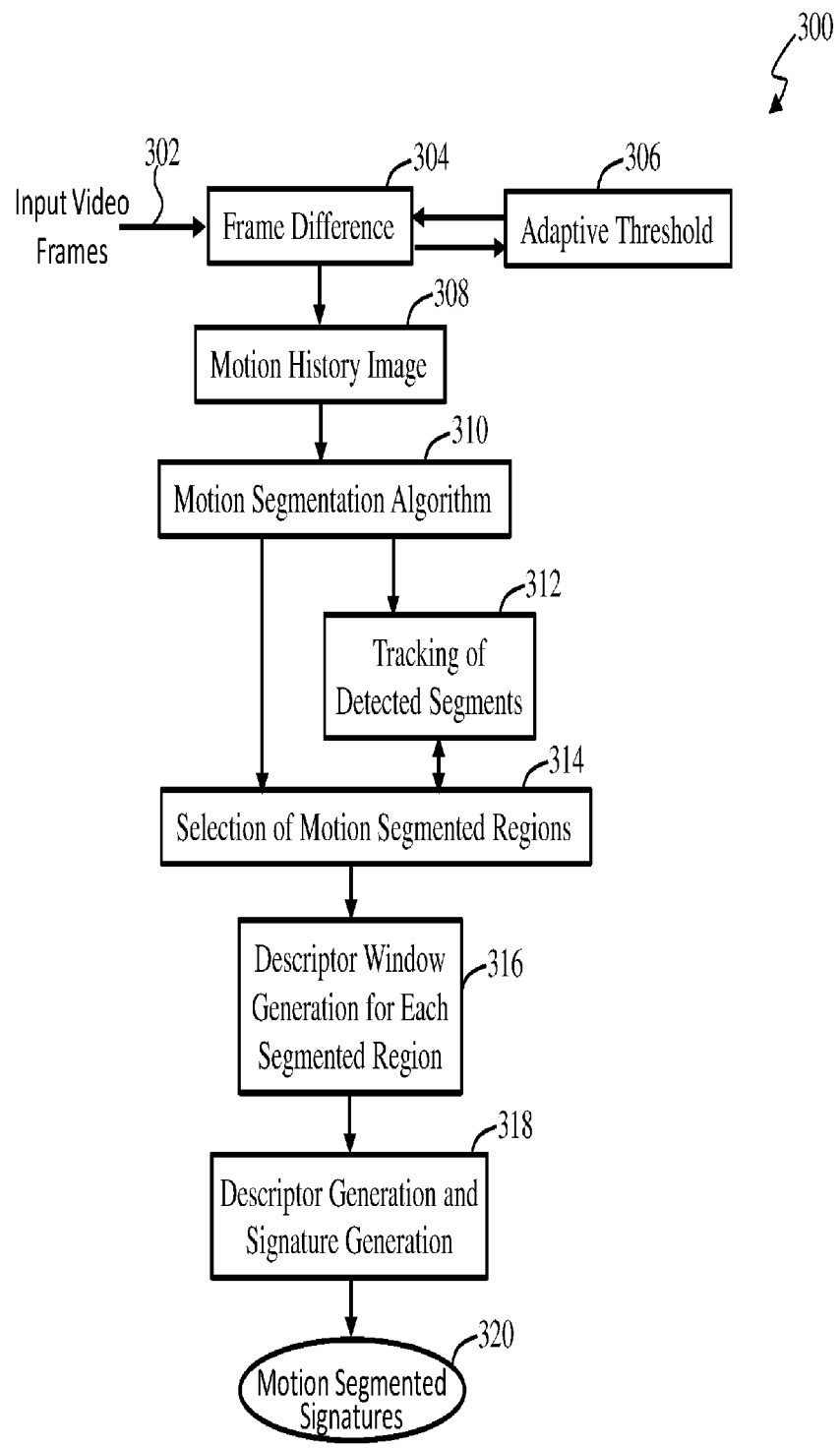
FIG. 3 illustrates a process for real time motion based video segmentation and signature generation in accordance with an embodiment of the present invention.

FIG. 3 illustrates a process 300 for real time motion based video segmentation and signature generation in accordance with an embodiment of the present invention. Input video frames 302 are processed and formatted allowing the input video frames in an input video sequence to be differenced using an adaptive algorithm to generate a two-frame difference image. The frames being differenced could be one or more frames apart. The differenced image is accumulated into a motion history image by adding together pixels from a difference frame to a previous difference frame with aging done by weighing pixels to reduce value of older frames. For recognition purposes, there is a time window of only a few seconds to typically less than a minute of video before the video will have changed into a different scene. For processing purposes, an object, including a logo, needs to be recognized by its motion, such as by trajectory signatures, and shape within that time window which dynamically changes. As frames are received, a plurality of two-frame difference images are generated. The motion history image is then segmented. The segmented sections are further selected based on criteria determined for motion activity and segment size. An amount of motion, determined by comparing foreground images with background images, and a size of a motion segment as compared with sizes of alternate segmented images distinguish whether the motion segment represents boundaries of a slightly moving object or a trajectory of an object that moves significantly. In case there are not enough segmented regions meeting size and activity requirements, previously segmented regions are tracked and considered to be selected as a segment region.

At step 304, the frame difference image after binarization, $Silh_k$ can be determined from the input video frames 302 and based on an adaptive threshold according to:

if $I_k(x)-I_{k-n}(x)>AT_k$ $Silh_k(x)=1;$

Else $Silh_k(x)=0;$

Where the location parameter "x" represents an (x,y) location on a frame, $AT_k$ is the adaptive threshold for motion at frame k; and $I_k(x)$ is the pixel intensity at location x in the image of frame k; $I_{k-n}(x)$ is the pixel intensity at location x in the image of frame k-n; and $Silh_k(x)$ is the frame difference after binarization at location x in the image. The parameter "n", while generally set to a 1 for processing a present frame and the immediately preceding frame, the value of "n" can vary generally for the case when the image has a lot of motion and is application and video dependent. Binarization translates an image into regions with movement and regions with low movement.

At step 308, the motion history image $MHI_k$ is calculated from $Silh_k$ as follows:

$$MHI_k(x)=MHI_{k-1}(x)*DecayFactor+Silh_k(x)$$

Where the location parameter "x" represents an (x,y) location on a frame and the DecayFactor is a selected value which is used to age the previous frame value of $MHI_{k-1}$. For the first calculation, $MHI_{k-1}$ is set to a value of zero. The motion history image values for a sequence of frames are accumulated, individually stored, and indexed by a frame number.

In an alternative embodiment, a function used to update the motion history image is as follows:

If $Silh_k(x)!=0$ where !=stands for not equal, $MHI_k(x)$ is set=to timestamp for values of x in frame k Else If (($Silh_k(x)=0$) and ($MHI_k(x)$<(timestamp−Age), where the Age parameter is used to age out older motion history frames and has a typical max setting of one minute.

$MHI_k(x)=0$ which indicates no motion

Else $MHI_k(x)=MHI_k(x)$, which indicates no change to the motion history frame

Segmented Regions Tracking

At step 310, a motion segmentation algorithm is used to process the motion history image for each frame k to determine a set of one or more image segments for the frames of the input video sequence. Multiple methods are used for motion segmentation due to the variability of images analyzed and some methods work better than other methods. Motion history based segmentation works well for an object that vibrates or moves about one area. When motion is larger, motion history provides region of movement, and a next step of tracking (spatial) supports segmentation of an object. Alternately, motion history of objects across multiple frames can still aid in identifying a video with similar objects and motion.

At step 312, previously detected image segments, also referred to as segmented regions herein, are tracked and added to a list of segmented regions. The tracking feature is useful when there is only slight or no change to the video, and hence no or few motion image segments for a selected number of frames in the video sequence. Also, the number of frames in a set may vary due to the motion detected. In such cases of low motion, the tracked previous segments from other frames in the video sequence help generate signatures to assist in audio video synchronization. At step 314, motion segmented regions are selected. Sometimes objects move more, or are sometimes steady, or sometimes only parts of an object move. So, if there is an object that was segmented based on its previous motion, that object can be selected and tracked. However, to improve segmentation of the continuous image, other previously segmented parts of the image are tracked as well.

Figure 9A:
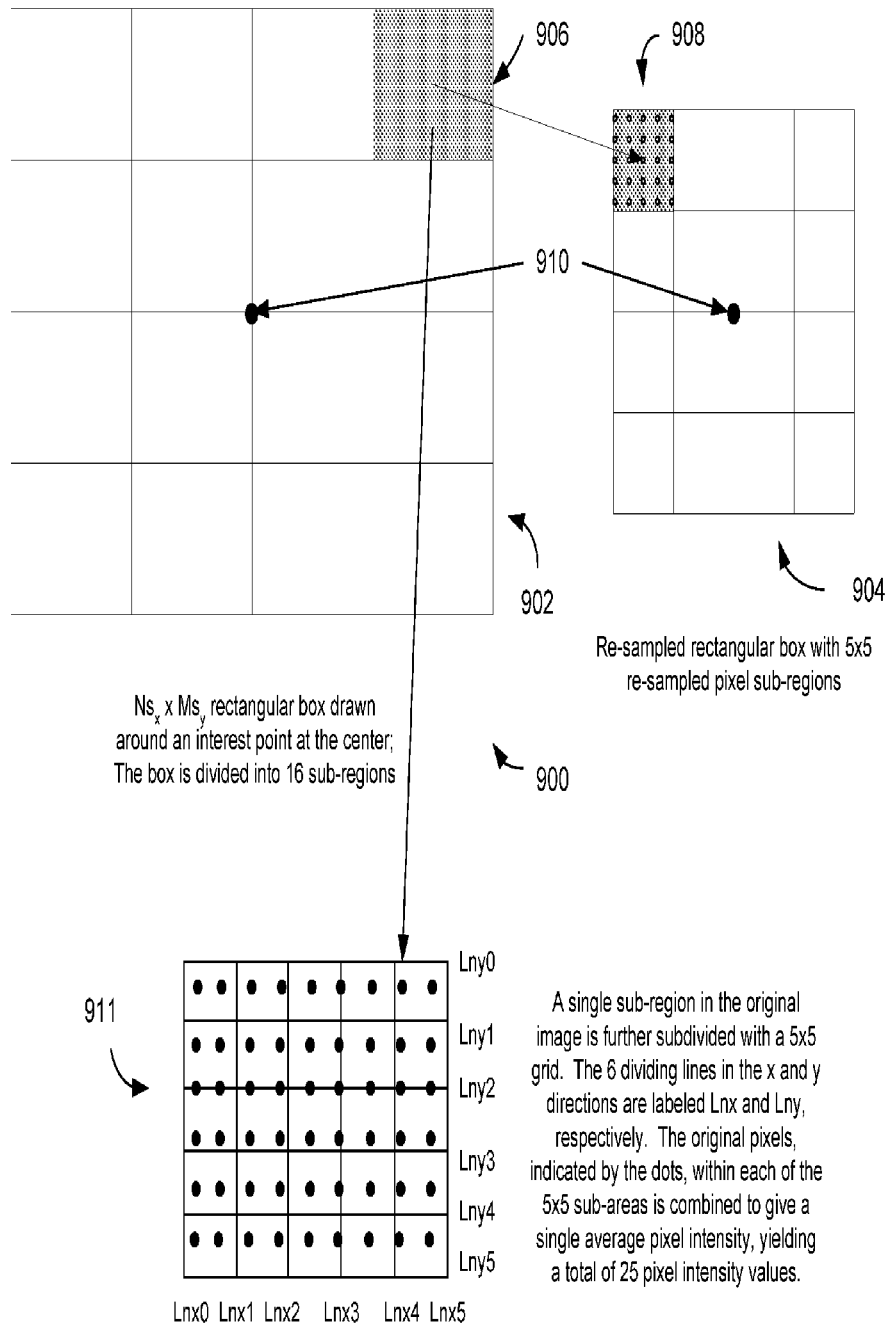
FIG. 9A illustrates part one of a descriptor generation process in accordance with an embodiment of the present invention.

At step 316, a descriptor window is generated for each segmented region, as described in more detail with regards to FIG. 9A. At step 318, descriptors are generated for each generated descriptor window as described in more detail with regards to FIGS. 9A and 9B. At step 320, motion segmented signatures are output.

Motion Segmentation with Background Difference Computation

Figure 4:
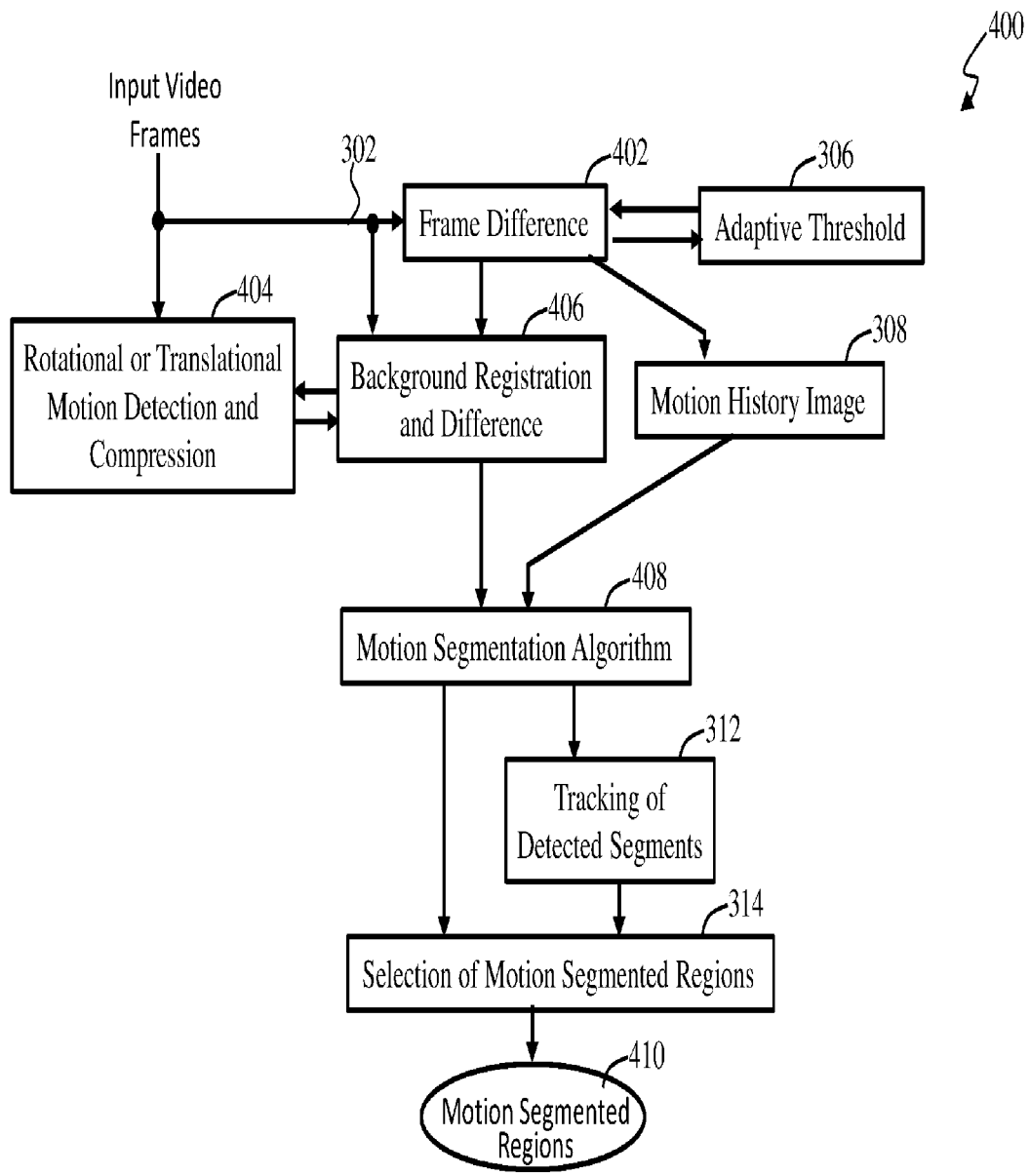
FIG. 4 illustrates a generic motion segmentation process for object boundary extraction and tracking in accordance with an embodiment of the present invention.

A more detailed block diagram of motion segmentation steps 304-314 of FIG. 3 is shown in FIG. 4. FIG. 4 illustrates a generic motion segmentation process 400 for object boundary extraction and tracking in accordance with an embodiment of the present invention. The process 400 consists of frame difference computation at step 402, determining an adaptive threshold at step 306, detection of translation or rotational motion and compensation at step 404, background registration and background difference computation at step 406, motion history image calculation and accumulation at step 308, motion segmentation algorithm at step 408 which is based on a method of background detection, and object detection and tracking, and post-processing in steps 312, 314 to produce motion segmented regions 410.

At step 308, video frames are differenced using an adaptive algorithm. The frames being differenced could be one or more frames apart. The differenced image is accumulated into a motion history image, as described above for processing of motion history images.

Objects in the video may have a translational and or rotational motion which needs to be detected. At step 404, detection of the translation and or rotational motion is performed by analyzing motion gradients and global motion orientation for each detected image region. Additionally, performing zoom or zoomout, a form of compression, calculations using image region size evolution are essential to accurate segmentation of objects as performed at step 408.

In addition, at step 406, background information is extracted by identifying pixels not moving for a long time, which can vary but, for example, one minute is considered a really long time in video processing, and subsequently a background difference is calculated for a specific number of frames. Generally, a few seconds worth of video frames has been found to be more than sufficient to determine the specific number of frames to use. With a known background removed, it is easier to segment the remaining image more accurately. Based on the background difference, a background mask is generated that is valid for the determined number of frames. The background image together with the frame difference image are used to determine a formation of pixels, the foreground pixels as further described below, moving against the background.

Background Subtraction

At step 406, the background $B_k(x)$ is aligned and foreground pixels are selected at each frame k by computing the distance between $I_k(x)$ and the currently aligned background $B_k(x)$. The background alignment is done primarily to compensate for any motion in a background between frames. However, background motion compensation may need to be done within a frame between image regions if there is fast motion, such as a crowd in the background at a sports game. After binarization $DB_k$ is obtained which can be considered a mask of 1s and 0s over a frame which indicates that the distance is greater than a distance threshold Tp or less than or equal to the distance threshold Tp, respectively. The threshold Tp is adaptive to the evaluation in a similar manner to the description of the adaptive threshold generation process 500 of FIG. 5.

if $I_k(x)-B_k(x)>Tp$ $DB_k(x)=1$;

Else $DB_k(x)=0$;

Foreground pixels are the $I_k(x)$ having $DB_k(x)=1$. The initial object mask generated by object detection may have some noisy regions because of irregular object motion due to camera movements and noise. Also, object boundaries may not be sufficiently smooth. Sufficiently smooth is determined from filtering operations that measure the perimeter of an object and its stability across a plurality of frames. Therefore, a post-processing step is used for noise region elimination and boundary smoothing.

Motion Compensation for Translational Motion

Returning to step 404, global motion in a region consists of feature block selection, global motion estimation, and global motion compensation. Global motion compensation is performed on the block level. Motion estimation is performed at step 406 by estimating the original position and its translation over time and provided to step 404. Both steps 404 and 406 detect stability of each decision in a continual manner to reduce likely error or noise.

In a first step, blocks with a motion activity measure above an activity threshold are selected as feature blocks.

In a second step, the motion orientation of each feature block between the current frame and the background frame is calculated. At this step, the process 400 determines the direction of motion, orientation, of the foreground between frames. Motion orientation is basically direction of motion for translational movement. The average motion in pixels computed for all feature blocks represents a global motion vector. After global average motion and orientation has been determined, any motion detected in the background, such as a background of trees which varies due to motion of branches in the trees, and the background mask are compensated for this background motion. The range of motion of the foreground relative to the background can be estimated.

In the processing step 408 of object segmentation a selection mechanism based on a connected region size that is used to eliminate too small regions, such as generated on slight movements of the background area. This process eliminates holes in a change detection mask, which holes often occur when a texture of foreground objects is not sufficiently pronounced. A change detection mask basically creates a region of interest around a selected region, after filtering for small holes. After this processing step, the foreground regions, which normally are pixel objects in motion, are filtered in a similar manner. Connected regions are pixels that are connected after morphological, edge detection methods, and region growing methods, dilation and erosion steps. For more details, refer to U.S. patent application Ser. No. 15/172,826 filed Jun. 3, 2016 entitled "Logo Recognition in Images and Videos" having the same assignee as the present application, are related applications, and are hereby incorporated by reference in its entirety, to address any segmentation questions.

Adaptive Threshold Generation

Figure 5:
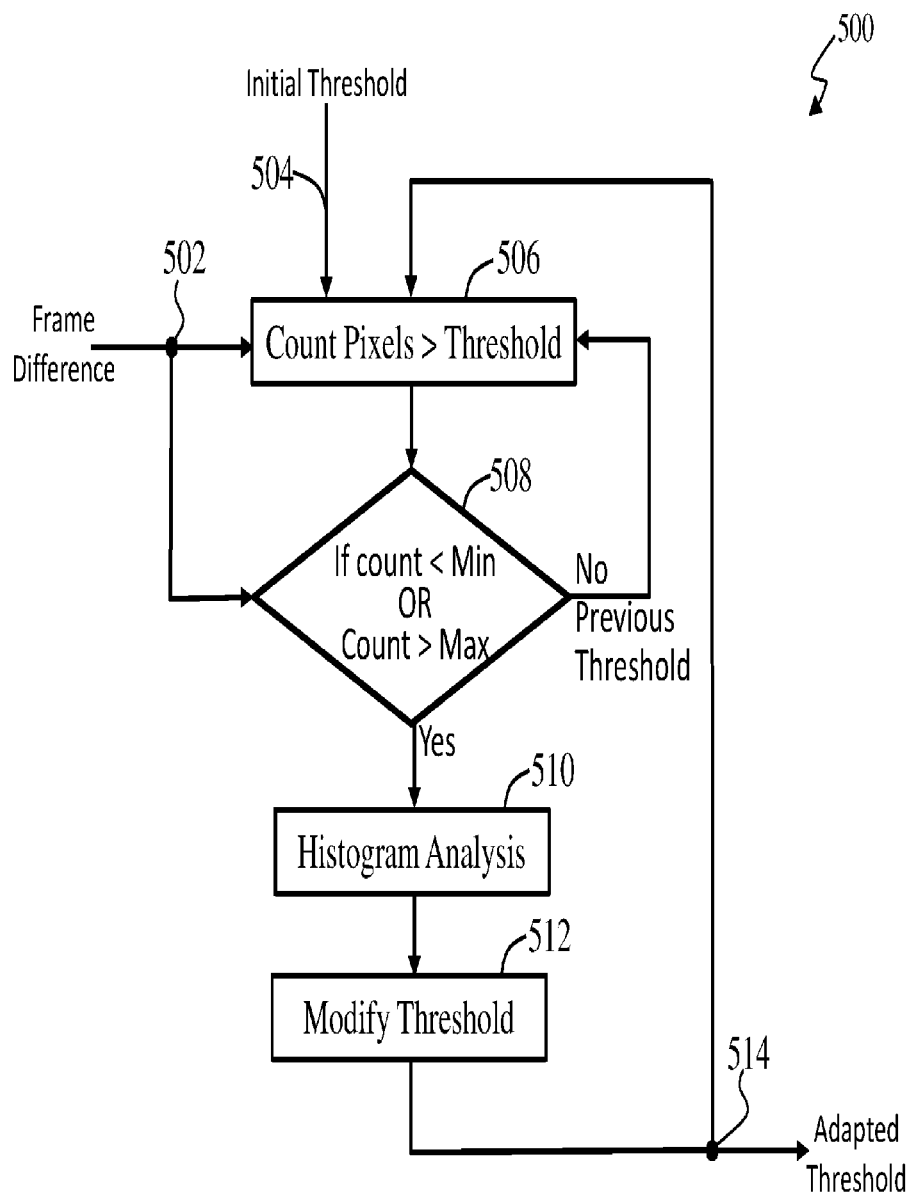
FIG. 5 illustrates an adaptive threshold generation process that accounts for changes between frames in accordance with an embodiment of the present invention.

FIG. 5 illustrates an adaptive threshold generation process 500 that accounts for changes between frames in accordance with an embodiment of the invention. The process 500 generates an adapted threshold 514 based on a frame difference calculation, such as provided by step 304, of a current frame with frames at distance of one or more using a preselected initial threshold or a last established threshold. At step 506, a count is made of a number of pixels in a detected image region which represents the size of the detected image region. The count to be used for threshold comparison. At step 508, a determination is made whether a pixel count of the differenced frame is less than a prescribed minimum (Min) threshold or greater than a prescribed maximum (Max) threshold. Then at step 508, if the count is not within the min and max limits, the process 500 proceeds to step 510. At step 510 a histogram analysis is done of image motion over a plurality of frames. For example, outliers in the image data may first be excluded and then a median value, for example, is generated for the number of frames utilized in the analysis. At step 512, the median value is used to set the threshold in order to adapt the threshold to the image movement over the analyzed number of frames, thereby creating the adaptive threshold. However, based on other history data, or experimentally, the median value may be biased lower or higher for better results. Returning to step 508, if the count is within the min and max limits, there is no change to the threshold and the process 500 returns to step 506 which monitors a count of the number of pixels in detected image regions as new frames are differenced.

Motions Segmentation Refinement

Figure 6A:
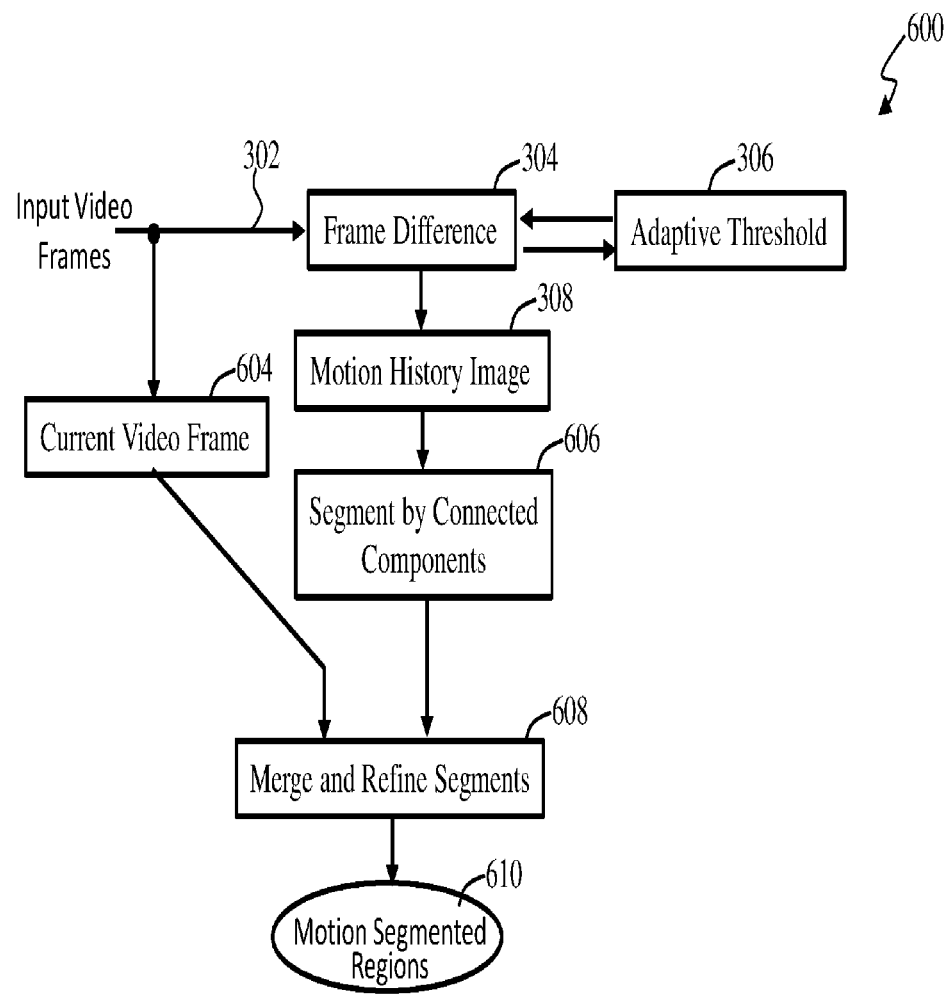
FIG. 6A illustrates a motion segmentation refinement process in accordance with an embodiment of the present invention.
Figure 6B:
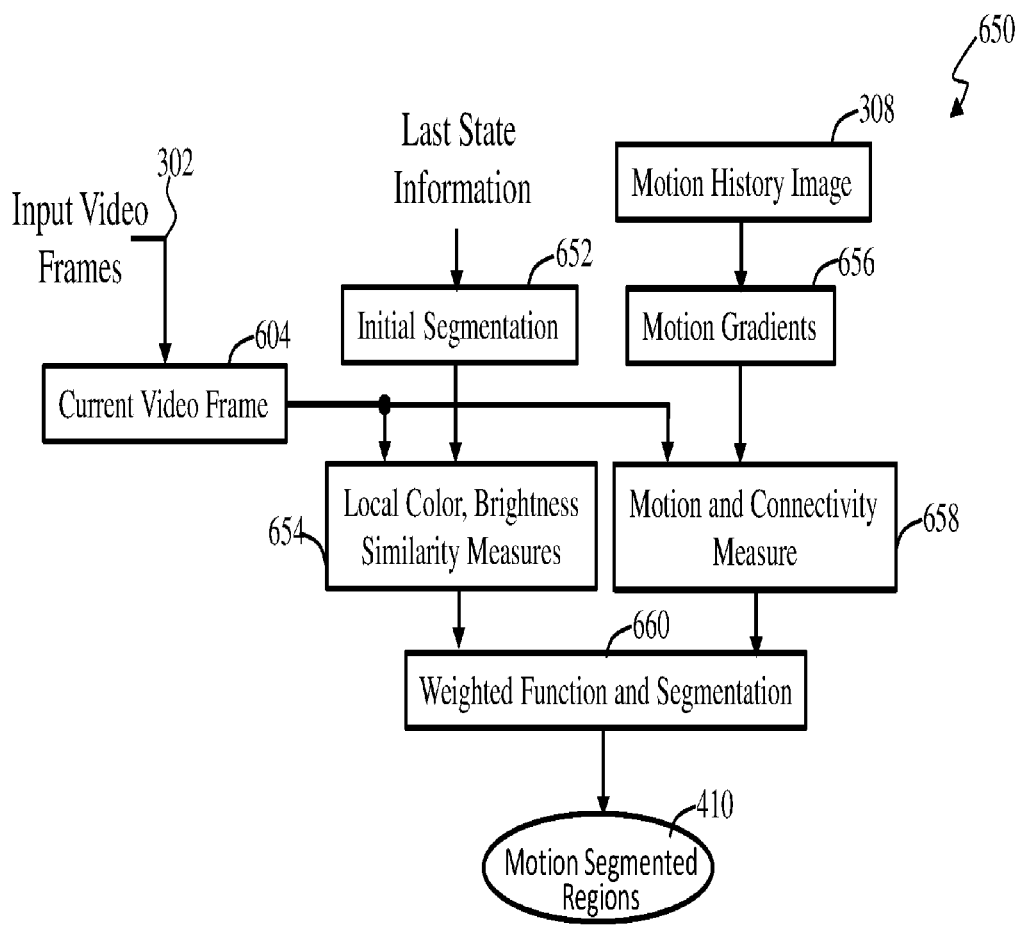
FIG. 6B illustrates a connected components and current video frame feature similarity process in accordance with an embodiment of the present invention.

FIG. 6 presents motion segmentation refinement process 600 in accordance with an embodiment of the present invention. The method processes the motion history image using connected components analysis shown in more detail in FIG. 6B. The process 600 further uses feature similarity of pixels in the current video frame to assist in segmentation refinements. FIG. 6B illustrates a connected components and current video frame feature similarity process 650 in accordance with an embodiment of the invention. At step 652, an initial segmentation is generated based on a last state information from motion history. At step 654, the current video frame, generated in step 604, is processed to generate similarity measures, such as local color, brightness, and texture, for an initial segmentation, the motion segments, and neighboring pixels. At step 656, motion gradient including motion orientation are derived using edge detection and region growing analysis, for example, from the motion history image generated at step 308. At step 658, connectivity measures are derived from both the motion history image and current video frame. To arrive at a final decision of segmentation, at step 660, a weighted function of the above similarity measures is generated and the initial segments are refined and merged to generate the motion segmented regions 610.

Refinement for Object Detection and Tracking

Figure 7:
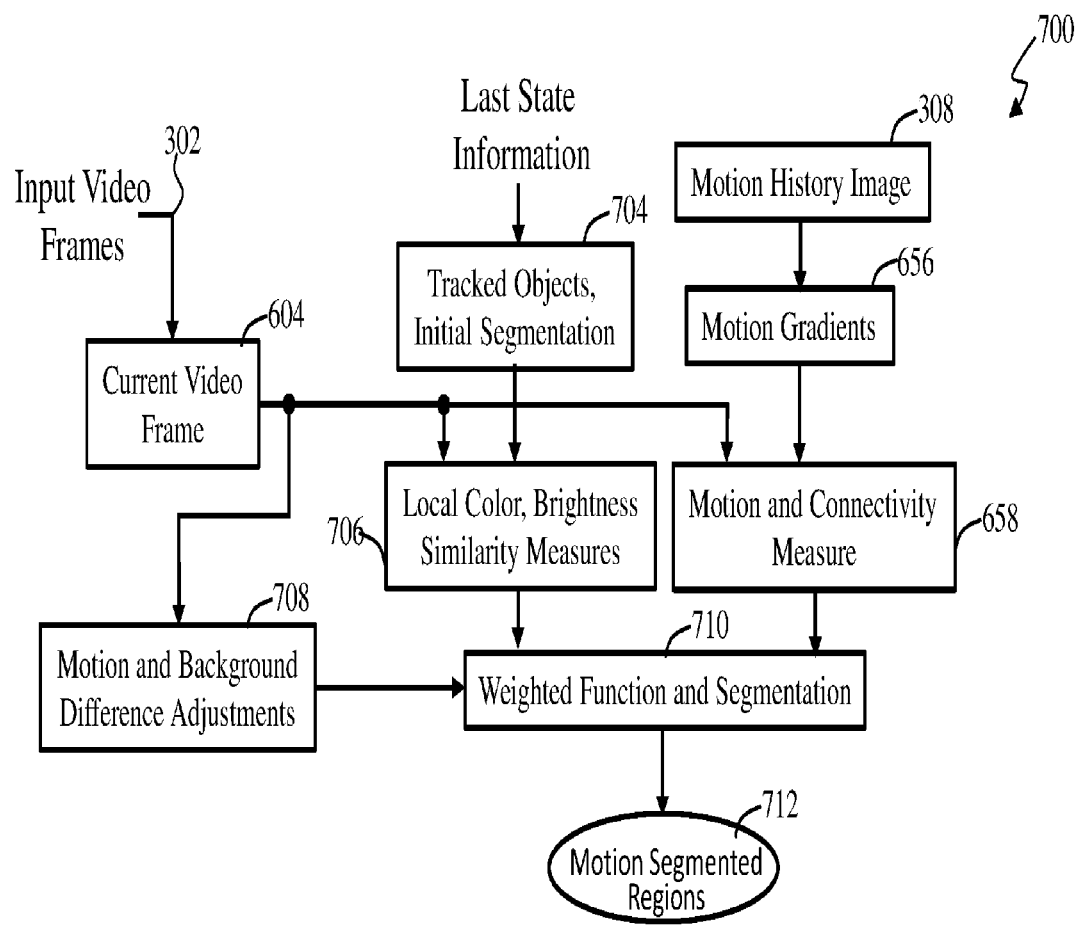
FIG. 7 illustrates an object detection and tracking segmentation process in accordance with an embodiment of the present invention.

FIG. 7 illustrates an object detection and tracking segmentation process 700 in accordance with an embodiment of the present invention. The method processes the motion history image using a connected components analysis, such as illustrated in the connected components and current video frame feature similarity process 650 of FIG. 6B. FIG. 7 shows an embodiment of usage of feature similarity is for merging or refining previously detected objects along with some feature and previous motion data. The steps 308, 604, 656, 658 of FIG. 7 provide the same functions as steps 308, 604, 656, 658 of FIG. 6B. The current video frame is processed to generate similarity measures for the motion segments and neighboring pixels. At step 704, an initial segmentation is generated based on a last state information from motion history. At step 706, the current video frame, generated in step 604, is processed to generate similarity measures based on color, brightness and also texture for an initial segmentation, the motion segments, tracked objects, and neighboring pixels. At step 656, motion gradient and orientation are derived using edge detection and region growing analysis, for example, from the motion history image generated at step 308. At step 658, connectivity measures are derived from both the motion history image and current video frame. At block 708, global motion and background difference adjustments are used to enhance and improve the segmentation and at step 710, a weighted function of the above similarity measures is generated and the initially detected objects are refined to generate the motion segmented regions 712.

Spatio-Temporal Motion Segmentation Based on Compressed Video Stream

Figure 8:
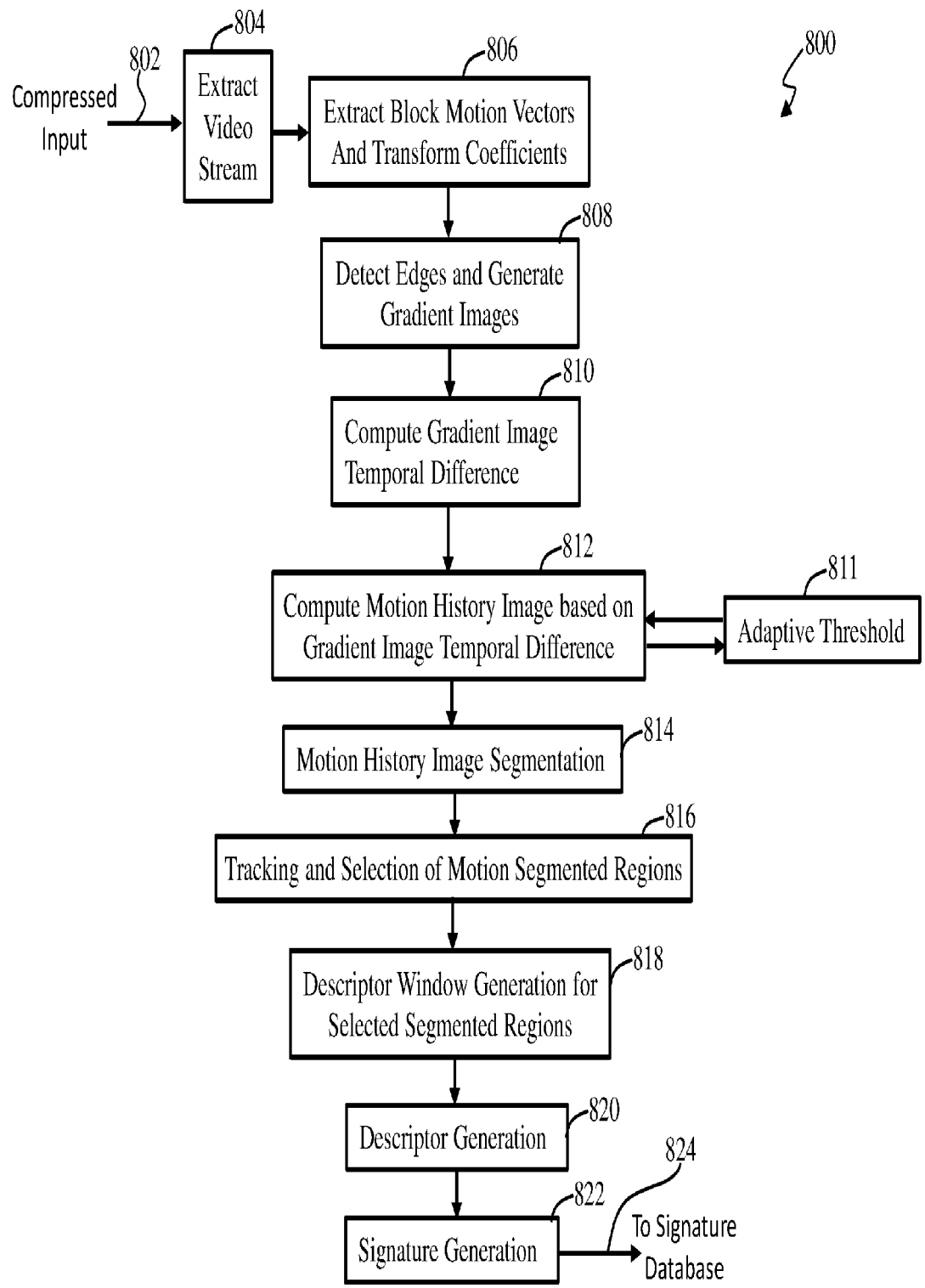
FIG. 8 illustrates a motion segmentation process based on partial decompression of motion vectors and transform coefficients from a compressed video sequence in accordance with an embodiment of the present invention.

According to an embodiment of the present invention FIG. 8 presents a process 800 to generate video frame signatures based on gradient images and motion fields computed directly from the compressed video stream without performing full decompression. At step 804, a compressed video stream is extracted from compressed input 802. At step 806, block motion vectors and transform coefficients are extracted from the extracted compressed video stream. At step 808, using the output from step 806, edges are detected and gradient images are generated. Generally, temporal gradient image difference is computed, and frame background is extracted. Regions in motion are detected, and descriptor window is generated around regions in motion.

At step 810, gradient image temporal difference, between current frame and the previous frame, is calculated. At step 812, a motion history image is computed based on the gradient image temporal difference and an adaptive threshold function from step 811 is applied to identify moving objects.

At step 814, background information is extracted by identifying pixels not moving for a long time, and subsequently a background difference is calculated. Based on the background difference a background mask is generated. The background mask together with the frame difference mask is used to determine a formation of pixels moving against the background to generate motion history image segmentation.

The initial object mask generated by object detection has some noisy regions because of irregular object motion in connection to camera movements and noise. Also, the object boundaries may not be sufficiently smooth. Therefore, at step 814, a processing step is used for noise region elimination and boundary smoothing.

In the processing step 814, in object segmentation an algorithm is used to label connected regions. Subsequently, at step 816, a selection mechanism based on the connected region size is used to eliminate too small regions which are mostly generated on the slight movement of the background area. This process eliminates holes in the change detection mask, which often occur when the texture of the foreground objects is not sufficiently pronounced. After this step the foreground regions are filtered in the similar manner, resulting in the removal of noise and ambiguities in moving region boundaries. Global motion estimation and compensation are performed on the block level based on selected gradient frame features and available motion vectors. The gradient image differences are accumulated into a motion history image. The motion history image is then segmented.

At step 816, the segmented sections are further selected based on criteria such as motion activity in segments, segment size, etc. For the case when there are not enough segmented regions meeting the size and the activity requirements, previously segmented regions are tracked and considered to be selected as a new segmented region. At step 816, motion segmented regions are output.

In another embodiment, motion is detected in compressed video by analyzing the motion vectors. The motion vectors indicate the amount of translation and changes per blocks of image. Sometimes the quality of these motion vectors is noisy, and higher level understanding is needed that can be provided by filtering, detecting connected parts, and detecting edges.

An advantageous factor is that the video has already been analyzed for motion when it is encoded in a compressed form. Taking advantage of this previous analysis enables a significant reduction in computation if motion segmentation is performed, at least for the steps as described herein, and refinement is done on few frames, and few local areas.

Spatio-Temporal Descriptor/Signature Generation

At steps 818-822, the spatio-temporal descriptor and signature are generated, as described in more detail below with regard to FIGS. 9A and 9B. FIG. 9A illustrates part one of a descriptor generation process in accordance with an embodiment of the present invention. At step 818, a descriptor window, also referred to as a descriptor box 902, is generated for selected motion segmented regions. The rectangular box 902 generated for a selected motion segmented region step 816, contains a formation of pixels identified as a selected motion segment, is used to generate a descriptor, signature, and a compact signature representing that rectangular image area. A collection of suitably selected motion segments within a video frame, with derived descriptors and associated signatures, represents that video frame. Since the motion segment is derived over two or more frames, the motion segment is assigned to represent the last frame of the two or more frames. The use of segmentation aids in recognition, focuses on an object, and reduces query cost.

The descriptor box 902 is centered and an interest point at a spatial (x,y) position in the motion segmented region with a size proportional to a scale factor in the x direction sx and to a scale factor in the y direction sy. To generate a descriptor, each descriptor box is divided into a grid of N×M ((N=4)×(M=4), in this example) to create NM (16) blocks, as presented in FIG. 9. The NM blocks are numbered by two indices, Nx and My, that identifies the position of the block in the x and y direction, respectively. Nx and My each take on values from 0 to N−1 for Nx and 0 to M−1 for Ny, that increases from top to bottom, or left to right.

For each block of the NM blocks, such as block 906, a 5×5 pixel grid 911 is created from the pixel data that corresponds to the block. This 5×5 pixel grid 911 is a sub-image that resembles a "down sampled" version of the pixel data that is computed as follows. First, lines that define the 5×5 pixel grid 911 are determined, where these lines are given with sub-pixel accuracy and are not necessarily aligned with the pixel boundaries. The lines in the x- and y-direction can be computed independently. The lines are numbered 0 to 5, where line 0 is the left or top extreme edge, line 5 is the right or bottom extreme edge, and a line k separates the 0 to k and the k to 5 pixels in the 5×5 pixel grid 911. The formula for line k in the x-direction is given by equation-1 for N=M.

$$Lx(k) = centerx + Gx*(Nx - N/2) + Gx*(k/5)$$ [equation-1]

where $$Gx=(Sx)/N \quad \text{[equation-2]}$$

The first component in equation-1 is the center of the grid, the second component is the offset to the left edge of the grid, and the third component is the offset to the kth line of the grid. In equation-2, Sx is a scale factor in the x direction. Similarly, Gy is based on a scale factor in the y direction.

For each pixel in this bounding box, iterate from left to right and compare the pixel center to each of the lines of the 5×5 pixel grid computed earlier. The pixel center is considered to be offset from the pixel edge by half a pixel width. For instance, the top-left pixel is at position (0.5, 0.5), whereas the top-left edge of the image is at (0,0). If a pixel is greater than or equal to line Lx(k) and less than line Lx(k+1), it is considered part of the kth sub-grid pixel in the x-direction. A similar method is used in the y-direction, to accumulate the image pixels into a bucket associated with one of the 5×5 pixel grid positions, keeping track of the total number of pixels in a bucket as well as the total sum of pixel values in a bucket. Note that it is possible that an image pixel does not fall into any of these buckets because it is on one of the extreme edges of the block. The 5×5 pixel grid is obtained by computing the average pixel value in each bucket, where the total pixel value is divided by the number of pixels.

Figure 9B:
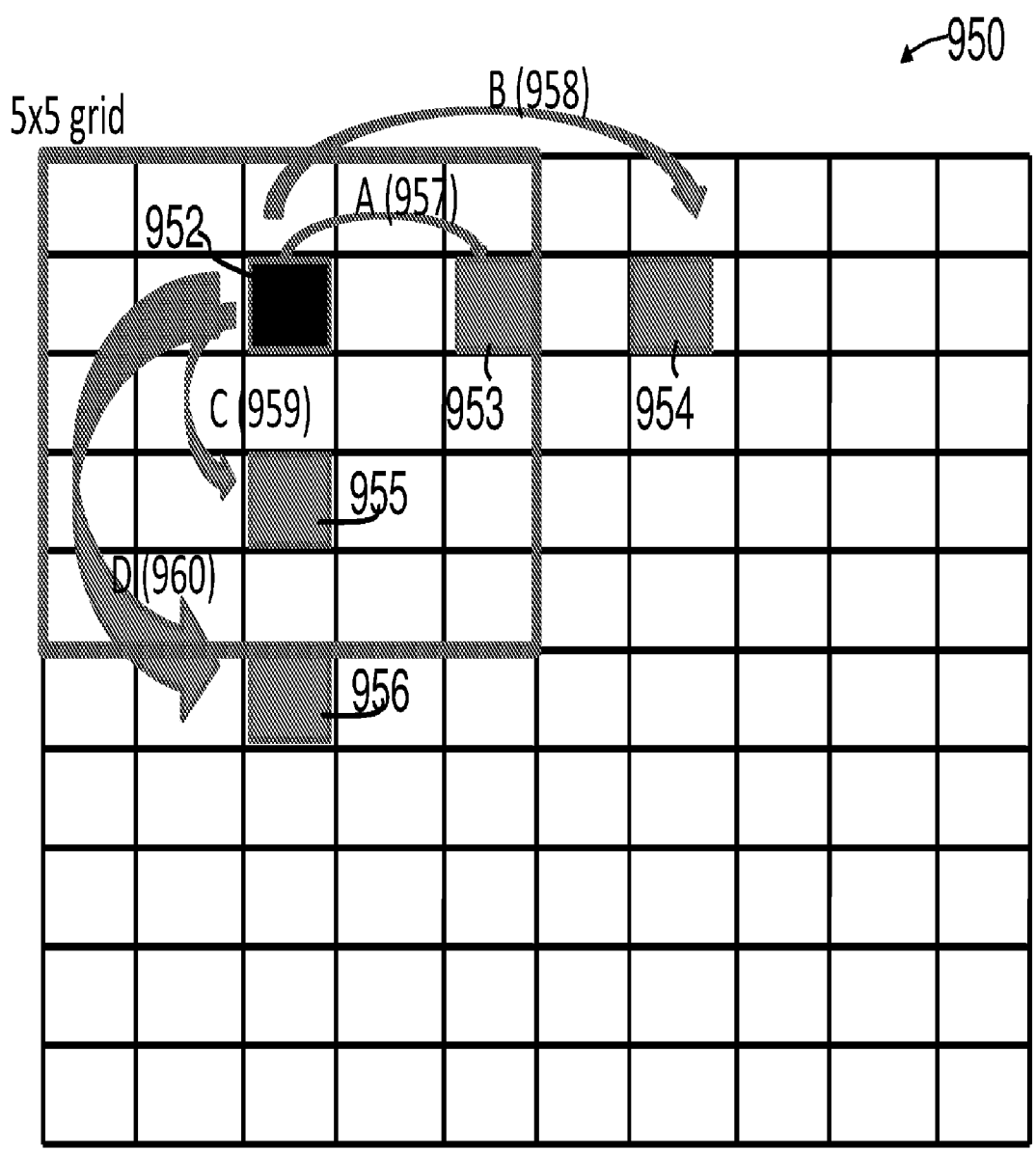
FIG. 9B illustrates part two of the descriptor generation process in accordance with an embodiment of the present invention.

FIG. 9B illustrates part two of a descriptor generation process in accordance with an embodiment of the present invention. The 5×5 pixel grid that is computed for each block of the $N^2$ blocks for N=M, is used to generate 4 values. This is done by first computing "global" (as opposed to local) gradient values. For each pixel in the 5×5 grid, the difference to several other pixels is computed. Referring to FIG. 9B, for example, the differences from reference pixel 952 to four different pixels are computed: 2 pixels right (difference=A 957 between pixels 952 and 953), 4 pixels right (difference=B 958 between pixels 952 and 954), 2 pixels down (difference=C 959 between pixels 952 and 955), and 4 pixels down (difference=D 960 between pixels 952 and 956). Such a pixel might not exist for pixels near to the right or bottom borders, so these will access the 5×5 pixels in the neighboring block. When no such block exists, additional blocks might need to be computed along the right and bottom borders.

These difference values are combined into one or more values, using a weighted sum of the values. The "x-gradient" is computed as the weighted sum of A and B, $$xgrad = w1*A + w2*B,$$

and, similarly, the "y-gradient" is computed as the weighted sum of C and D, $$ygrad = w3*C + w4*D.$$

The weights w1 to w4 can depend on many factors, but in one embodiment, they depend on the agreement of the signs of the values A and B, and C and D. For example, if A and B are of the same sign, then w1=1.1 and w2=0.2, whereas if A and B are of different values, then W1=1.2 and w2=0.0. This can be generalized to any number of values in the x and y direction, and different weighting factors, and different decision factors.

For the 5×5 grid of pixels, two values are computed, the xgrad and the ygrad for each of the pixels. From this set of values, four sums are computed:

−1*sum of xgrad for each pixel, where xgrad is negative
sum of xgrad for each pixel, where xgrad is positive
−1*sum of ygrad for each pixel, where ygrad is negative
sum of ygrad for each pixel, where ygrad is positive In total, a descriptor consists of $4 \times N^2$ values, a concatenation of these 4 values for each of the $N^2$ blocks covered by the descriptor. By design, these values are all positive. For other embodiments of a descriptor used in the context of this submission see related patent application [U.S. Pat. No. 8,195,689, entitled "Media Fingerprinting and Identification System"] referenced above.

To describe videos effectively, spatial descriptor as generated according to the process of FIGS. 9A and 9B as well as motion descriptors further described herein are used in another embodiment. The motion descriptor describes the spatial, intensity, and temporal attributes for each scene change, such as may occur every 1-2 secs. Motion descriptors can also be applied to an individual object or segment if it is a dominant feature of the video.

Figure 10:
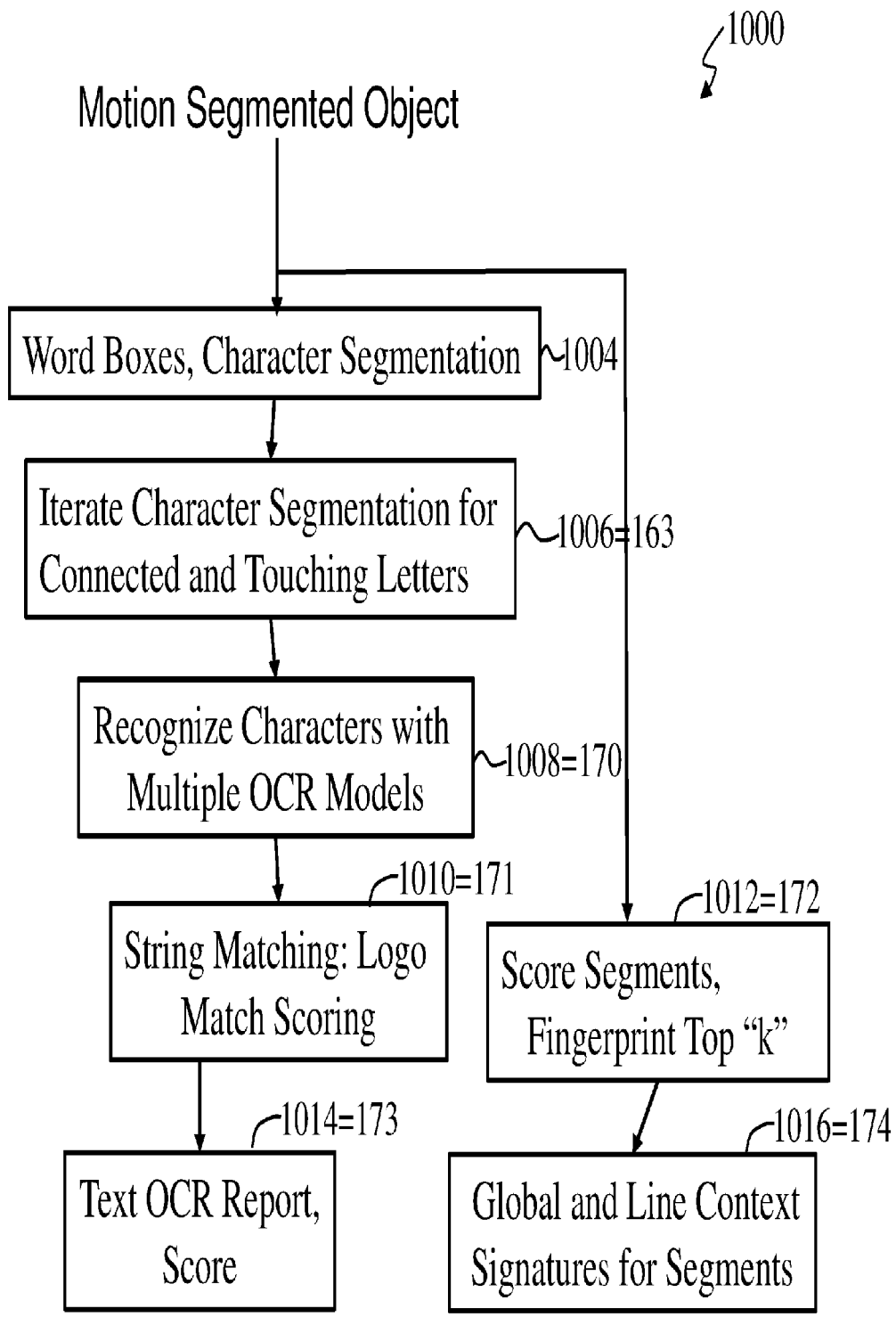
FIG. 10 illustrates a process for image segmentation and processing of identified images including logos for motion segmented objects in accordance with an embodiment of the present invention.

FIG. 10 illustrates a process 1000 for image segmentation and processing of identified images including logos for motion segmented regions, including objects such as logos in accordance with an embodiment of the present invention. At step 1004, motion segmented regions are received, for example, from steps 320, 410, 610, 712, or 816. One or more of these motion segmented regions will have classified segments that are identified as logo-like segments. Such classified segments are further segmented into characters using, for example, contour analysis of connected components, stroke width transform analysis and stroke density analysis, including analysis of a number of horizontal and vertical strokes and number of loops, stroke transition analysis, and use of stroke heuristics to segment the image into characters. At step 1006, an iterative step is performed for connected and touching letters to segment the characters using stroke transition analysis and stroke heuristics. At step 1008, the segmented characters are recognized using one or more text classifiers with one or more optical character recognition (OCR) models. In the preferred embodiment, two classifiers are used to allow different types of fonts. For example, a first classifier is used for bold fonts and a second classifier is used for fonts with shadows. Further classifiers may be added for cursive bold fonts and another classifier for combination of all standard fonts. At step 1010, string matching is performed. String matching allows consideration of frequently occurring words with reduced weight in string match scoring for commonly occurring words or sub-strings. At step 1014, the output includes an optical character recognition (OCR) report, a score from the string matching per brand at segment and image level, and a likely matching logo.

At step 1012, the classified segments from the motion segmented object input are sorted by their logo like properties and only the top k segments are selected for next stage processing via feature analysis, signature generation, and passing the classified segments to neural network classification, for example. The parameter "k" is a predetermined number which is set to a specific number, such as 20, that represents a maximum number of logo-like segments that should be processed per image. Also, at step 1012, the regions are sorted by logo-like properties and selected segments are fingerprinted. One fingerprinting approach is a global method which uses gradients and trend and phase agreement to create a descriptor and then generate the signatures. Additional fingerprints generated are line context signatures of detected keypoint regions. Line-context signatures are derived from line-context descriptors and a line-context descriptor is a set of parameter values organized in consecutive order and derived from lines and edges detected as passing through an area centered on a keypoint. Signatures are generated for originally detected interest regions, termed keypoints, as well as, for extended or combined keypoint regions. At step 1016, outputs are generated, such as global and line context signatures for segments.

These signatures generated herein can be efficiently deployed as primary video content signatures in various application environments, including an audio-video system for content feature extraction, identification, and search.

Those of skill in the art will appreciate from the present disclosure additional alternative systems and methods for digital video fingerprinting using motion segmentation in accordance with the disclosed principles of the present invention. Thus, while particular embodiments and applications of the present invention have been illustrated and described, it is to be understood that the invention is not limited to the precise construction and components disclosed herein and that various modifications, changes and variations which will be apparent to those of ordinary skill in the art may be made in the arrangement, operation and details of the method and apparatus of the present invention disclosed herein without departing from the spirit and scope of the invention.

The invention claimed is:

1. A system comprising:
a memory that stores instructions; and
one or more processors configured by the instructions to perform operations comprising:
differencing two frames using an adaptive threshold to generate a two-frame difference image;
creating a motion history image from the two-frame difference image;
segmenting the motion history image to generate one or more motion segmented regions; and
generating a descriptor and a fingerprint for a selected motion segmented region.

2. The system of claim 1, wherein the two frames are a first frame and a second frame immediately following in sequence from the first frame.

3. The system of claim 1, wherein the two frames are a first frame and a third frame skipping an intermediary second frame, wherein the second frame and third frame are in sequence from the first frame.

4. The system of claim 1 further comprising:
tracking previously detected segments in previously segmented motion history images that are not included among the one or more motion segmented regions.

5. The system of claim 1 further comprising:
adaptively modifying a threshold when a pixel count in a detected image region of the differenced frames is outside defined limits.

6. The system of claim 1, wherein the selected motion segmented region has a higher motion activity and larger size compared to the rest of the one or more motion segmented regions.

7. The system of claim 1, wherein the segmenting of the motion history image uses a weighted function of motion gradient and motion orientation.

8. The system of claim 1, wherein the segmenting of the motion history image uses similarity measures of pixels based on brightness, continuity and color.

9. The system of claim 1 further comprising:
extracting a compressed video stream from a compressed input; and
extracting block motion vectors and transform coefficients from the extracted compressed video stream.

10. A system comprising:
a memory that stores instructions; and
one or more processors configured by the instructions to perform operations comprising:
differencing two frames using a motion adaptive threshold based on a motion histogram analysis to generate a motion adapted two-frame difference image,
as frames are received, determining a motion history image from generated motion adapted two-frame difference images over a plurality of frames,
segmenting the motion history image to generate one or more motion segmented regions, and
generating a descriptor and a fingerprint for a selected motion segmented region.

11. The system of claim 10, wherein the motion adapted two-frame difference image includes at least one image region in motion that is monitored to produce the motion histogram analysis.

12. The system of claim 10 further comprising:
determining the motion histogram analysis of at least one image region in motion from the motion adapted two-frame difference image over a plurality of frames.

13. The system of claim 10 further comprising:
determining a count of pixels in image regions of the motion adapted two-frame difference image; and
modifying the motion adaptive threshold to a new value based on the motion histogram analysis when the count is not within a threshold range.

14. The system of claim 10, wherein the motion adaptive threshold is set to a median of the motion histogram analysis.

15. The system of claim 14, wherein outliers of the motion histogram analysis are not considered in the generating the median of the motion histogram analysis.

16. The system of claim 14, wherein the median of the motion histogram analysis is biased lower or higher based on history data.

17. The system of claim 10 further comprising:
tracking of motion segmented regions per frame is used to store previous motion segmented regions which are selectively included in the one or more motion segmented regions for which descriptors and fingerprints are generated.

18. A computer readable non-transitory medium storing a computer program which causes a computer system to perform a method of processing video to generate fingerprints for motion segmented regions over two or more frames, the method comprising:
differencing two frames using a motion adaptive threshold based on a motion histogram analysis to generate a motion adapted two-frame difference image;
as frames are received, determining a motion history image from generated motion adapted two-frame difference images over a plurality of frames;
segmenting the motion history image to generate one or more motion segmented regions; and
generating a descriptor and a fingerprint for a selected motion segmented region.

19. The computer readable non-transitory medium of claim 18, wherein the method further comprises:
determining the motion histogram analysis of at least one image region in motion from the motion adapted two-frame difference image over a plurality of frames.

20. The computer readable non-transitory medium of claim 18, wherein the method further comprises:
determining a count of pixels in image regions of the motion adapted two-frame difference image; and modifying the motion adaptive threshold to a new value based on the motion histogram analysis when the count is not within a threshold range.

\* \* \* \* \*